(No Model.)

W. Y. McPHERSON.
HORSE DETACHER.

No. 282,347. Patented July 31, 1883.

Witnesses
J. Henry Kaiser
Wm. C. McIntire

Inventor
Walter Y. McPherson
By J. N. McGuire, atty.

UNITED STATES PATENT OFFICE.

WALTER Y. McPHERSON, OF OWENSBOROUGH, KENTUCKY.

HORSE-DETACHER.

SPECIFICATION forming part of Letters Patent No. 282,347, dated July 31, 1883.

Application filed May 11, 1883. (No model.)

*To all whom it may concern:*

Be it known that I, W. Y. McPHERSON, of Owensborough, in the county of Daviess and State of Kentucky, have invented certain new and useful Improvements in Automatic Releasement Contrivances for Harness; and I do hereby declare that the following is a full, clear, and exact description thereof, reference being had to the accompanying drawings, making part of this application.

My invention relates to certain new and useful improvements in the appliances employed in hitching horses to carriages, and has for its object to provide simple and efficient means by which, in case of a runaway or dangerous affright of the horse, the animal may be instantly released completely from the shafts and single-tree or whiffletree of the vehicle, so that he can run off without any possibility of taking with him the vehicle or any portion thereof, or any device permanently connected therewith.

To this end and object my invention consists in the employment, in connection with shaft attachments to which the shaft-tugs, shaft-strap, and breech-straps are attached, and from which these parts become automatically released in the event of the traces becoming detached from the whiffletree of the vehicle, of suitable means by which the hooks or other devices of the whiffletree to which the rear ends of the traces are coupled may be instantaneously detached from the ends of said whiffletree, all as will be hereinafter more fully explained.

To enable those skilled in the art to which my invention relates to make and use the same, I will now proceed to more fully describe it, referring by letters of reference to the accompanying drawings, which form part of this specification, and in which I have illustrated my invention carried out in that form in which I have so far practiced it, and which is about the best form of carrying it out now known to me.

Figure 1:
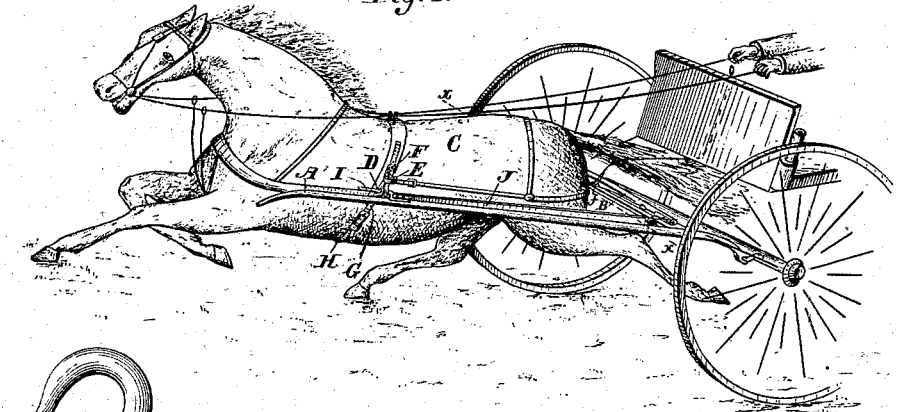
Figure 2:
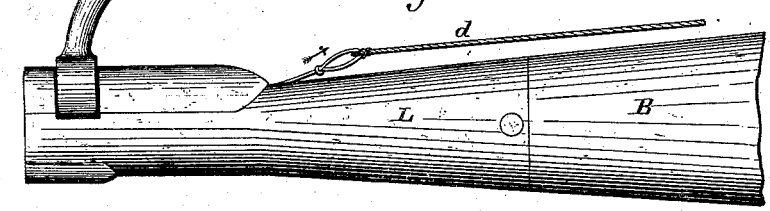
Figure 3:
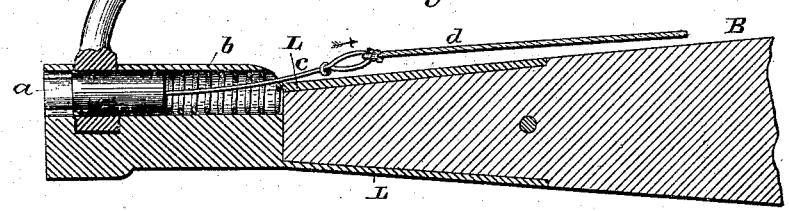
Figure 4:
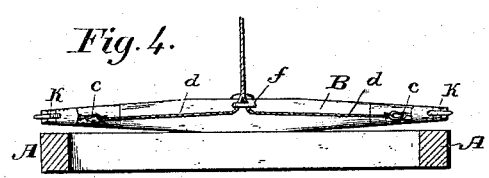
Figure 5:
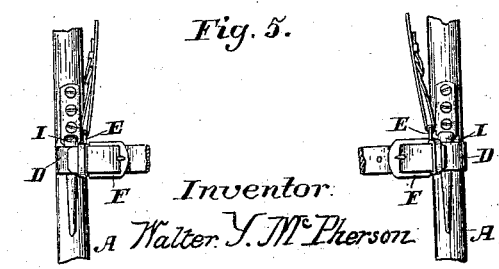

In the drawings, Figure 1 is a perspective view, showing so much of the vehicle, horse, and harness as is necessary for the purpose of illustrating my invention. Fig. 2 is a top view, on an enlarged scale, of a portion of the single-tree or whiffletree, for the purpose of better illustrating the novel construction of and appliances thereto by means of which the trace-hooks may be easily and instantly detached from the ends of the whiffletree. Fig. 3 is a horizontal central section (on the same scale) of the devices shown at Fig. 2. Fig. 4 is a partial vertical cross-section at the line $xx$ of Fig. 1, for the purpose of better showing the arrangement of the devices seen on a smaller scale in the perspective view of the drawings; and Fig. 5 is a partial or detail top view, showing simply the bayonet-like shaft attachments or fixtures, together with the tug-like portion of the harness and a portion of the breeching of the latter.

In the several figures the same part will be found designated by the same letter of reference.

A A represent the shafts or thills, and B the single-tree or whiffletree, of the vehicle, to which the animal C is harnessed in about the usual manner, with the exceptions which I will now explain.

Instead of having the harness provided with the usual tugs through which pass the shafts A A, I provide said harness with a leather or other suitable device arranged one at each side of the animal, and formed or provided each with a sort of loop, D, also with a rearwardly-projecting metallic or other loop, E, and with a buckle, F, at its upper end, the lower portion terminating in a simple strap end, as seen at G. By means of the buckle F these devices at each side of the animal are respectively secured at their upper ends with a saddle of the harness, while by means of their strap ends G they are respectively secured to the opposite ends of a belly-band or strap, H, which is provided at each end with a buckle, and which answers as a substitute for the ordinary shaft-band, the ends of which are usually secured to the shafts A A.

To each one of the shafts A A, preferably on the upper surface thereof, is securely bolted a metallic bayonet-like device, I, the bar portion of which, $I^2$, is adapted to be passed into and to be accommodated within the loop-like portion D of the device, the said loop-like portion being adapted to come to a lateral bearing when moved backwardly (as will be presently explained) against the shoulder-like portion $I^3$ of said device or fixture I.

The ends of the breeching or breeching-strap, instead of being fastened to the shafts A in the usual manner, are carried forward and secured to the loop-like devices E, as clearly shown, so that when the horse backs against the breeching-strap the loop-like portions D will be forced backwardly to a bearing against the shoulder-like portions I³ of the shaft fixtures, all as clearly shown.

From what has just been explained, together with the illustrations given in the drawings, it will be clearly understood that while the shafts A A are properly held in the right relative position with the harness, so as to be prevented from either lifting up or falling down, and that while the breeching will be securely braced in substantially the usual manner, the horse, together with the harness, is all perfectly free to permit the entire release-ment backwardly of the shafts A A, provided the traces J J of the harness be not fastened at their rear ends to the whiffletree of the vehicle.

Instead of having the trace-hooks or other devices to which the rear ends of the traces are coupled permanently secured to the ends of the whiffletree or single-tree in some one of the usual ways, I provide detachable trace-hooks K K, which are coupled to and which may be detached from the ends of the whiffletree by the following-named means, and in the manner which I will now explain:

Securely fitted to each end of the whiffletree is a metallic ferrule-like device or socket-piece, L, in the solid end portion of which is arranged a sliding bolt or bar, a, which is provided, as shown, with a spiral spring, b, arranged concentrically about its innermost end, and from which extends a suitable pull-bar, c, adapted to be secured to the end of and to be operated in a suitable manner by a chain or other suitable device, d. As shown, the solid end portion of the ferrule-like device L, within which the spring-bolt a is housed, has a cut-out or recess for the accommodation of the perforated inner end or eye of the trace-hook K, and the outermost end of the spring-bolt a is preferably made slightly smaller than the rest of said bolt, so that in the event of any frictional wear by the strain and turning of the trace-hook said bolt may never be worn down smaller during that portion of its body which is surrounded by the eye of the trace-hook than is the end or portion of said bolt which protrudes beyond the bearing-surface of the eye of the trace-hook. By this peculiar construction of the spring-bolt the possibility is avoided of said bolt being worn at its bearing portion, so as to create a shoulder that would prevent the bolt from being freely moved longitudinally and inwardly while there might be a pulling strain on the trace-hook.

The operation of the devices just explained will readily be understood to be about as follows, viz: Supposing the trace-hook to be coupled to the metallic device of the whiffletree by means of the spring-bolt a, and the parts all in working order, to effect easily a complete detachment of the trace-hook from the end of the whiffletree it is only necessary to pull on the pull-bar c in the direction indicated by the arrow at Fig. 2 to a sufficient extent to pull the bolt a inwardly against the action of its spiral spring b, to withdraw the holding or outer end of said bolt completely from the eye of the trace-hook. For conveniently and expeditiously doing this, I have by preference provided the pull-bar c with a chain or cord, d, which runs alongside of the whiffletree toward its middle, passing through guides f, and extending from the middle portion of the whiffletree upwardly to any extent and to any locality, from which said chain or cord may be at all times conveniently grasped and manipulated by the driver or other occupant of the vehicle.

It will be understood that in the general operation of the harness contrivance herein shown and described it is only necessary, in case of necessity, for the driver or other occupant of the vehicle to manipulate the chain or cord just referred to in the manner explained, when the trace-hooks at either end of the single-tree will be instantaneously and completely disengaged from the single-tree, and that then, by reason of the shaft's being held in the manner hereinbefore explained, and by reason of the breeching of the harness being secured to the loop-like devices of the harness attachments, instead of to the shafts, the animal, together with the entire harness, will be perfectly free to depart from the vehicle and its shafts or thills and single-tree, provided the reins are released from the hands of the driver, without any possible danger of injury or accident either to the vehicle or to its occupants; and it will be observed that this novel mode of operation and the advantages accruing from this capacity to free the horse and harness from the vehicle are accomplished in a simple manner and without any materially expensive or complicated attachments or devices. The bayonet-like fixtures I may be economically made, and are easily secured properly to the shafts, while the holdback-loops or other devices usually applied to the shafts are dispensed with, and the new portions of the harness or supplementary devices herein shown and described are such as will not render the cost of the harness any more than usual.

Of course the details of construction of the various devices may be varied more or less from what I have shown and described without materially changing the novel principle of construction and mode of operation of the means employed for easily disengaging the trace-hooks or other equivalents from the ends of the single-tree, and by which, after such disengagement of the traces from the vehicle, the horse and harness are free to leave the shafts of the vehicle without danger of entanglement with any portion thereof. In case of fright or accident all the driver or other occupant of the carriage has to do is to pull on some suitable device for the purpose of releasing the trace-hooks from the ends of the single-tree, when the horse will be free to go off with the harness in the manner already explained.

Of course other means than that shown and described may be employed for simultaneously pulling back the spring-bolts to release the trace-hooks, and some other particular construction of trace-hook and holding device may be employed than that I have shown, without departing from the spirit of my invention.

Having now so fully explained the construction and operation of my improved contrivance, what I claim therein as new, and desire to secure by Letters Patent, is—

1. In combination with any suitable harness provided with loop-like devices at either side of the saddle, and with means for fastening the breeching-straps to the devices which carry the said loop-like portions, the devices secured to the shaft of the vehicle, and adapted to operate in combination with said loop-like portions of the said devices at either side of the saddle, so as to effect the holding both upwardly and downwardly of the abutment for the breeching to pull back against, and so as to permit the said loop-like portions of the harness to be freely disengaged from said shaft attachments whenever the traces may be uncoupled from the vehicle, all substantially as hereinbefore explained.

2. In combination with the means shown and described by which the shaft and harness are so connected that the latter may be separated from the former in the manner explained, detachable trace hooks or fasteners which may be simultaneously uncoupled from the ends of the traces, all substantially in the manner and for the purposes explained.

In witness whereof I have hereunto set my hand this 1st day of May, 1883.

W. Y. McPHERSON.

In presence of—
J. N. COURTNEY,
T. S. ANDERSON.